United States Patent [19]

Armor et al.

[11] 4,039,872

[45] Aug. 2, 1977

[54] GUIDE VANE ASSEMBLY FOR REVERSE FLOW COOLED DYNAMOELECTRIC MACHINE

[75] Inventors: Anthony F. Armor; James B. Archibald, both of Schenectady; William L. Darby, Scotia, all of N.Y.

[73] Assignee: General Electric Company, Schenectady, N.Y.

[21] Appl. No.: 691,363

[22] Filed: June 1, 1976

[51] Int. Cl.$^2$ .............................................. H02K 9/06
[52] U.S. Cl. ........................................ 310/62; 310/55
[58] Field of Search ........................ 310/52, 57, 53, 54, 310/55, 58, 59, 61, 62, 63, 64, 65, 260, 270

[56] References Cited

U.S. PATENT DOCUMENTS

| 2,752,515 | 6/1956 | Baudry | 310/64 |
| 3,265,912 | 8/1966 | Baudry | 310/59 |
| 3,497,737 | 2/1970 | Philofsky | 310/58 |

FOREIGN PATENT DOCUMENTS

| 555,799 | 4/1958 | Canada | 310/64 |

*Primary Examiner*—R. Skudy
*Attorney, Agent, or Firm*—John F. Ahern; James W. Mitchell

[57] ABSTRACT

A reverse flow cooled dynamoelectric machine is provided with guide vanes and a guide vane mounting assembly comprising means for mounting and positioning the guide vanes, and means for directing the flow of cooling gas from the fan to the cooler. A fan nozzle ring is attached to the machine stator. An outer vane support ring is fixed to the fan nozzle ring and is provided with a circumferentially extending dovetail recess along its inner face. An inner vane support ring is spaced radially inwardly from the outer support ring and is also provided with a dovetail recess along its inner face. A plurality of guide vanes having inner and outer dovetail end portions mating with the dovetail recesses of the inner and outer support rings are held in place by the support rings. An annular rub strip is disposed adjacent to the outer support ring and is fixed to the fan nozzle ring. The rub strip includes a serrated inner face which, with the tips of the fan blades, produces a seal. A flow guide ring is provided adjacent the fan rub strip and acts to smoothly direct the flow of cooling gas away from the fan toward the cooler. The guide vanes and the mounting assembly are formed from electrically non-conducting materials to prevent induced heating of the assembly from stray flux at the end of the dynamoelectric machine.

9 Claims, 7 Drawing Figures

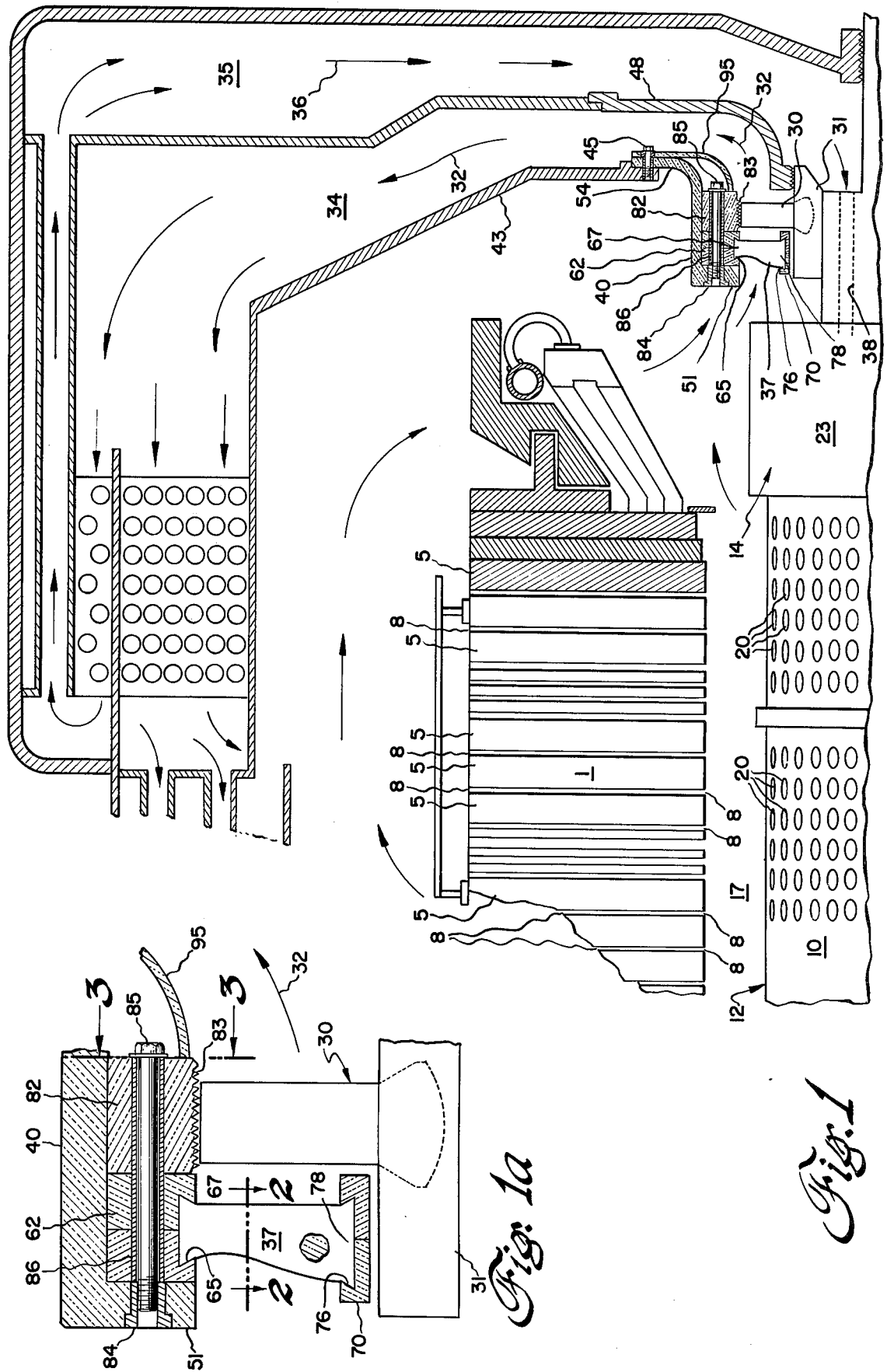

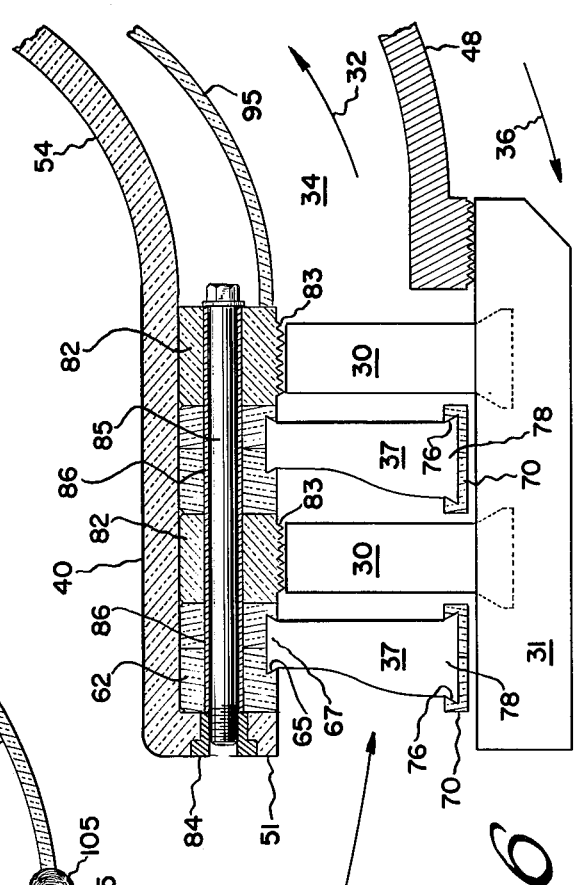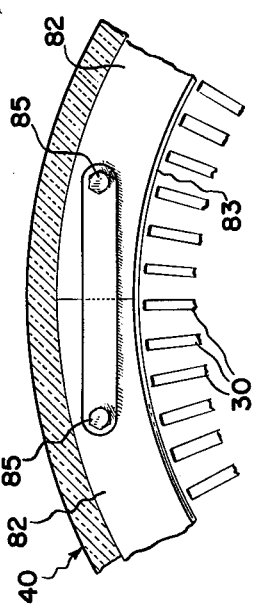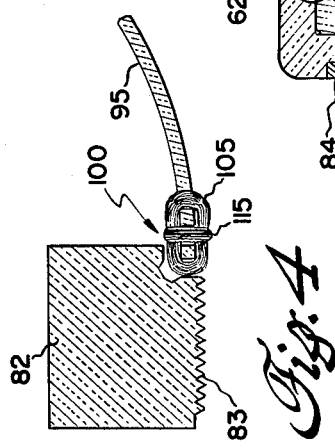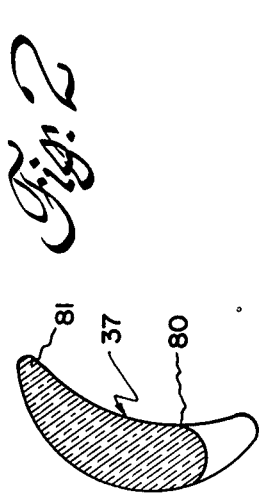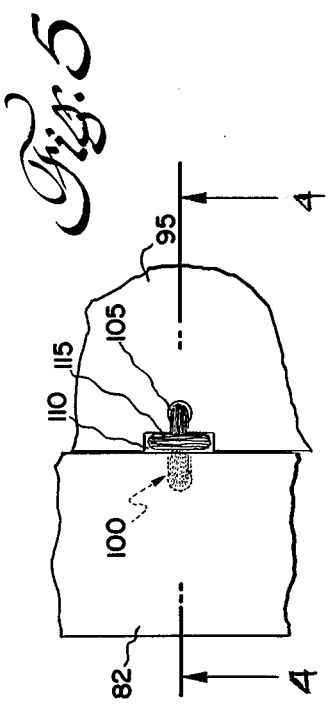

GUIDE VANE ASSEMBLY FOR REVERSE FLOW COOLED DYNAMOELECTRIC MACHINE

FIELD OF THE INVENTION

This invention relates generally to a reverse flow cooled dynamoelectric machine and more specifically to a guide vane mounting assembly employed in a reverse flow cooled dynamoelectric machine.

DESCRIPTION OF THE PRIOR ART

Large dynamoelectric machines suvch as turbine-generators are pressurized with a cooling gas such as hydrogen which is pumped throughout the machine by a fan fixed to the rotor. The cooling gas is pumped by the fan through cooling passages in a laminated stator core and into a gas gap defined by the interior of the stator core and the rotor surface. Cooling gas may be picked up by the rotor at is outer surface in a manner described in U.S. Pat. No. 3,348,081, to D. M. Willyoung, and pumped through cooling passages defined by the field coils within the rotor, such structure being shown in U.S. Pat. No. 2,986,664, to D. M. Willyoung and P. A. Becker.

One particular cooling system employed in dynamoelectric machines is known as reverse flow cooling, an example of which is disclosed and claimed in U.S. Pat. No. 3,739,208 to Shartrand and assigned to the assignee of the present invention, the disclosure of which is incorporated by reference hereinto. In a reverse flow cooling system such as that shown in the aforementioned Shartrand patent, cooling gas is drawn from the end of the gas gap into the fan and is pumped by the fan to a gas cooler usually located in the upper portion of the machine. From the gas cooler, the flow of cooling gas is split, a portion of it being channeled to the interior of an end portion of the rotor, and the remainder being channeled into cooling passages disposed within the laminations of the stator core.

In operation, these large turbine-generators tend to produce relatively large quantities of stray flux in the end regions. This stray flux is produced by both the rotor and the end turns of the armature bars in the stator and includes axial components which tend to penetrate the end portions of the machine causing undesirable eddy current heating. In reverse flow cooled turbine-generators, the cooling gas drawn from the end of the gap into the fan often has a rotational velocity component which has been imparted to the cooling gas by the rotation of the rotor. A multiplicity of guide vanes disposed immediately upstream of the fan have been provided, enabling the fan to turn this rotational component of the cooling gas velocity into a useful static pressure thereby enhancing the performance of the fan. However, the stray flux produced by the machine tends to induce eddy current heating in any magnetically susceptible metallic components employed in the guide vanes and any mounting assembly employed therewith. This induced heating in guide vanes and their mounting assembly adversely affects the dynamoelectric machine cooling system and thereby lowers the output capability of the machine.

The reverse flow cooled dynamoelectric machine of the present invention is provided with guide vanes and a mounting assembly therefor formed from electrically non-conducting materials which are not subject to induced heating. However, guide vanes and mounting means therefor employed in dynamoelectric machines must be capable of withstanding substantial loading from fluid pressure forces associated with the flow of cooling gas through the vanes and from vibration from the normal operation of the machine. Although being electrically non-conductive the guide vanes and mounting assembly employed in the dynamoelectric machine of the present invention have the requisite strength to withstand vibrational and fluid pressure loading in the operation of the machine. Moreover, the guide vanes and mounting assembly employed in the dynamoelectric machine of the present invention are characterized by an ease of installation and maintenance and by an absence of significant relaxation and dimensional instability of parts.

Therefore, it is an object of the present invention to provide a reverse flow cooled dynamoelectric machine having an improved guide vane assembly which is not subject to induced heating from stray flux produced in the end regions of the machine.

It is another object of the present invention to provide a reverse flow cooled dynamoelectric machine with an improved guide vane assembly having the requisite strength to withstand vibration and fluid pressure forces acting thereon in the operation of the machine.

It is another object of the present invention to provide a reverse flow cooled dynamoelectric machine with an improved guide vane assembly characterized by ease of installation and maintenance.

Still another object of the invention is to produce an improved guide vane assembly in a large dynamoelectric machine with freedom from problems of relaxation or dimensional instability of parts.

SUMMARY OF THE INVENTION

These and other objects apparent from the following detailed description taken in connection with the appended claims and the accompanying drawings are attained by providing an improved guide vane assembly comprising a series of guide vanes, means for mounting and positioning the guide vanes, and means for directing the flow of cooling gas from the fan to the cooler. A fan nozzle ring is attached to the machine stator. An outer vane support ring is fixed to the fan nozzle ring. An inner vane support ring is spaced radially inwardly from the outer support ring. A plurality of guide vanes are held in place by the support rings. An annular rub strip is disposed adjacent to the outer support ring and is fixed to the fan nozzle ring. the rub strip is an annular member which, with the tips of the fan blades, produces a seal. A flow guide ring is provided adjacent the fan rub strip and acts to direct the flow of cooling gas smoothly away from the fan toward the cooler. The guide vanes and the mounting assembly therefor are formed from electrically non-conducting non-magnetic materials to prevent induced heating of the assembly from stray flux at the end of the dynamoelectric machine. The outer vane support rings and rub strips are provided with stainless steel sleeves spaced circumferentially. These sleeves take the stainless steel bolts and prevent any problems due to bolting one non-metallic material directly to another. One or more sets of fan blades and associated guide vane assemblies may be provided to circulate cooling gas in the dynamoelectric machines of the invention. By the above construction the guide vanes and the mounting assembly are strong enough to withstand vibration and fluid pressure forces acting on them during the normal operation of the dynamoelectric machine.

BRIEF DESCRIPTION OF THE DRAWINGS

FIG. 1 is a view in partial section of one end of a reverse flow cooled dynamoelectric machine of the present invention employing an improved guide vane and mounting assembly utilizing one fan and one guide vane assembly.

FIG. 1a is an enlarged view of a portion of FIG. 1.

FIG. 2 is a view taken along line 2—2 of FIG. 1a.

FIG. 3 is a fragmentary view taken along line 3—3 of FIG. 1a.

FIG. 4 is a view of a portion of FIG. 1 enlarged to show the details of the attachment of the flow guide ring to the rub strip.

FIG. 5 is a partially broken away plan view of the structure shown in FIG. 4.

FIG. 6 is an enlarged view of a portion of a generator and is analogous to FIG. 1a, but illustrates an embodiment of the invention utilizing a plurality of fan and guide vane assemblies.

DESCRIPTION OF A PREFERRED EMBODIMENT

FIG. 1 shows an end portion of a reverse flow cooled dynamoelectric machine including a stator which comprises a core 1 having a plurality of laminations arranged in packages 5 separated by cooling gas passages 8. The opposite end of the dynamoelectric machine is substantially identical and therefore need not be illustrated here. A rotor 10 is disposed within stator core 1 and includes a body portion 12 and an end winding portion 14. The generator field winding is disposed within the rotor and may be directly cooled by gas picked up by the rotor from gap 17 and pumped through cooling passages machined in the windings and terminating in holes 20 in the outer surface of the rotor. The details of the field winding cooling passages are not part of the present invention but are disclosed in U.S. Pat. No. 3,986,664, to Willyoung and Becker. A retaining ring 23 is shrink-fitted onto the end of the rotor for the containment of the end windings of the field coils.

A fan 30 is fixed to a fan support ring 31 disposed at the end of the rotor and pumps cooling gas in the direction of arrows 32 from gap 17 to coolers disposed in the upper portion of the machine through a suitable channel 34 and then through cooling passages 8 in core 1. Gas is also fed from coolers to a suitable channel 35 as indicated by arrows 36 and enters the rotors end via passages 38 under the fan ring. Some of this gas then enters gap 17. In operation, the gas drawn from gap 17 by fan 30 passes over retaining ring 23 which imparts a rotational velocity component to the main axial flow. Guide vanes, one of which is shown at 37, are employed enabling the fan to turn this rotational velocity component into a useful static pressure thereby enhancing the performance of fan 30 and the entire cooling system of the machine. These guide vanes are also employed to direct the flow into the fan blades at a uniform angle. Metallic guide vane assemblies have been used in the past. However, stray flux produced in the end regions of the rotor and stator can cause the circulation of eddy currents in any metallic members disposed within the ends of the machine. These circulating eddy currents cause substantial heating within the end regions of the machine thereby adversely affecting the cooling system and lowering the overall performance of the machine.

To minimize the induced heating within the end regions of the dynamoelectric machine, non-metallic, non-magnetic composite guide vanes and a composite mounting assembly therefor are provided by the present invention as shown to FIGS. 1, 1a, 2 and 3. The guide vane mounting assembly employed in the dynamoelectric machine of the present invention comprises a generally annular fan nozzle ring 40 fixed to a member 43 by any suitable fasteners such as bolts in metallic bushings, one set of which is shown at 45. Member 43 forms one wall of channel 34. An opposite wall of channel 34 is formed by member 48. Fan nozzle ring 40 includes radially inner and outer flanges 51 and 54, respectively. To eliminate any induced heating in this area of the dynamoelectric machine, fan nozzle ring 40 is formed from an electrically non-conducting material such as a glass fiber material.

An outer guide vane support ring 62 is disposed adjacent inner flange 51 and includes a dovetail recess 65 which accepts a mating dovetail outer end portion 67 of guide vane 37. To prevent any induced heating of this support ring and yet provide a high-strength support for vane 37, outer support ring 62 is formed from electrically non-conducting resin-impregnated glass fibers, for example, formed by any of many well-known techniques.

Inner guide vane support ring 70, spaced radially outward from fan support ring 31 maintains the alignment of guide vanes 37 while ensuring the structural integrity of the guide vane assembly and includes a dovetail recess 76 which receives the radically inner dovetail end portions, one of which is shown at 78, of guide vanes 37. to prevent any induced heating from stray flux in inner support ring 70, this ring may be formed, for example, from glass fiber material. For added strength, guide vanes 37 are bonded to the support rings at the dovetail recesses thereof using suitable cement. Such a cement may be thermosetting resin cured at a temperature above machine operating temperature, thereby ensuring good adhesion under running conditions.

In operation of the dynamoelectric machine some cooling gas is drawn from gap 17, passes over retaining ring 23, and enters fan 30 through guide vanes 37 and some comes from the back of the core. The rotating retaining ring 23 imparts a rotational velocity component to some of gas drawn into the fan. To efficiently direct the cooling gas stream into the fan at the correct angle from root to tip, guide vanes 37, as best seen in FIG. 2, preferably have a non-constant airfoil section 80 from root to tip. These vanes number a hundred or more and may, for example, be molded from electrically non-conducting material such as diallyl phthlate resin reinforced with chopped glass. Guide vanes 37 enable the fan to develop more useful static pressure, while also improving fan efficiency.

To provide a seal with fan blades 30, a fan rub strip 82 is disposed adjacent outer vane support ring 62. Fan rub strip 82 is annular in shape and may be formed in the same operation as that which forms outer vane support ring 62 or may be formed separately. Fan rub strip 82 may be formed from the electrically non-conducting filaments as outer vane support ring 62, thereby obviating induced heating within the rub strip. Serrations 83 which form a seal with the outer edges of fan blades 30 are machined in the rub strip after its fabrication.

To mount outer vane support ring 62, and rub strip 82 on fan nozzle ring 40, inner flange 51 of fan nozzle ring 40 is bored and slotted at a plurality of circumferentially spaced locations and mating threaded metallic bushings, one of which is shown at 84, are installed using suitable cement in those bores and slots. Outer vane support ring 62 and fan rub strip 82 are bored in locations in alignment with the bores in inner flange 51 and metallic sleeves 86 are cemented therein to accommodate suitable fasteners, such as bolts, one of which is shown at 85, which hold these portions of the guide vane assembly together. Bushings 84, bolts 85, and sleeves 86 are preferably formed from a non-magnetic material such as non-magnetic stainless steel and chrome-copper. Both bushings and sleeves are affixed with a suitable cement. Such a cement may be a thermosetting resin cured at a temperature in excess of running temperature of the generator. In addition, to maintain the alignment of outer vane support 62 and fan rub strip 82 with inner flange 51 of fan nozzle ring 40, additional bores may be provided in these members to receive non-magnetic dowels.

The use of metallic, non-magnetic bushings, bolts and sleeves as described herein is an important feature of the invention. Great advantages is secured by the elimination of magnetically susceptible materials from the construction of the guide vane assembly. The use of molded or laid-up glass fiber members, for example, provides a non-magnetic structure which performs as effectively as a metallic magnetic structure and eliminates eddy current heating. It is necessary, however, that the non-metallic structure have sufficient mechanical strength and stability to operate in the environment of a turbine-driven generator. One eventuality to be avoided is the possibility of a "relaxation" of the dimensional stability of the non-metallic materials used, such that after tensioning of binding members, such as bolts, the non-metallic material might "relax" against the compressive stress and not be tightly bound. It is to avoid such an eventually that the bolts 85 bind upon chrome-copper bushings and stainless steel sleeves so that the binding stress is on metal-to-metal throughout, thus avoiding any possible "relaxation" and loss of mechanical integrity.

For ease of installation and maintenance outer vane support ring 62 and rub strip 82 may be cut into a plurality of arcuate segments which when assembled will form these members. The ability to remove the rub strip from the fan nozzle allows for radial removal of the dovetailed fan blades, there being enough radial depth taken by the rub strip to lift out the fan blades from the dovetail in the fan ring.

To provide a smooth transition for the flow of cooling gas from fan 30 to the upper portion of flow channel 34, a flow guide ring 95 is provided at the outer end of rub strip 82, being fixed to that member and bolted to outer flange 54 of fan nozzle ring 40 by bolts in metallic bushings 45. To obviate any induced heating therein, flow guide ring 95 is formed from an electrically non-conducting material such as, for example, a molded glass fiber material. For ease of installation and maintenance, it may be segmented into two arcuate members which, when assembled, form the ring. If a plurality of fan sections are utilized, each having its own associated rub strip, the flow guide ring 95 is affixed to the outer or downstream rub strip.

FIGS. 4 and 5 show the manner in which flow guide ring 95 is attached to rub strip 82. Flow guide ring 95 and rub strip 82 are drilled in a plurality of circumferentially spaced locations to form, when positioned together, a plurality of drilled U-shaped channels and holes, one of which is shown at 100. Electrically non-conducting ties 105 of roving material such as glass roving are then wrapped around flow guide ring 95 and rub strip 82 within channels 100, urging these members together. Flow guide ring 95 is also provided with a plurality of transverse channels, one of which is shown at 110, rectangular in cross section, and formed in the face of the guide ring which abuts the rub strip. Electrically non-conducting ties 115 of roving material are wrapped around ties 105 within control 110 to place ties 105 in tension, thus further urging flow guide ring 95 even more firmly into engagment with fan rub strip 82. This form of assembly is commonly known as a "wrap and frap" assembly and is disclosed in detail in U.S. Pat. No. 3,437,859 to E. E. Gibbs et al and assigned to the assignee of the present invention. Ties 105 are referred to as the wrapping ties while ties 115 are referred to as the frapping ties. Both ties may be impregnated with a curable resin which when hardened will ensure a high-strength junction between these two members in the face of possible high fluid pressure loading from the action of the gas leaving the fan 30 and sweeping up along the flow guide and vibrational forces resulting from the normal operation of the machine.

It can be seen then that the reverse flow cooled dynamoelectric machine of the present invention includes guide vanes and a guide vane mounting assembly for each fan stage which eliminates the possibility of induced heating therein. This mounting assembly is resistant to weakening or damage due to vibrational or fluid pressure forces acting thereon. The bonding of guide vanes 37 within the dovetail recesses of inner and outer support rings 70 and 62 provides a high-strength junction of these members. The plurality of bolts, bushings, sleeves, and dowels provided to fix the outer support ring and the rub strip to the fan nozzle ring provide a high strength and maintenance of alignment to this part of the assembly. The sleeves in the vane outer support ring and rub strip ensure no adverse effects due to material relaxation when bolting the parts together. The wrap and frap technique with which flow guide ring 95 is attached to rub strip 82 ensures the strength of this junction. The guide vanes and the mounting assembly therefor may be easily installed and maintained due to the segmented structure of the various annular members employed in the mounting assembly. They also provide for assembly and disassembly of the dovetailed fan blades.

While a single stage guide vane assembly and fan has been shown herein, it can be seen that this assembly can be employed in conjunction with a multistage fan merely by duplicating the support rings and the fan rub strip and arranging these members in axial alignment immediately upstream of each successive fan stage. Such an embodiment is illustrated in FIG. 6 in which like numerals are used to identify like parts as are illustrated in FIGS. 1 and 1a.

While there has been shown and described a specific embodiment of the guide vane assembly for a reverse cooled dynamoelectric machine, it will be apparent to those skilled in the art that modifications may be made without departing from the substance of this invention, and it is intended by the appended claims to cover such modifications as come within the spirit and scope of this invention.

What is claimed is:

1. A reverse flow dynamoelectric machine comprising a. a stator assembly including a core having axially spaced radial cooling passages disposed therein;
b. a rotor disposed within the interior of said stator and defining therewith a circumferential gas gap;
c. a fan and guide vane assembly including:
   $c_1$. at least one fan comprising a plurality of radial fan blades attached to said rotor and adapted to circulate cooling gas axially outwardly from said gas gap to a cooling means and therefrom to said stator and said gas gap;
   $c_2$. at least one guide vane assembly disposed inboard of said fan and upstream thereof for directing cooling gas toward said fan with optimum efficiency and including:
      $c_{2a}$. an outer guide vane support ring in fixed but removable relation to said stator assembly,
      $c_{2b}$. a plurality of airfoil sectioned guide vanes depending inwardly from said outer guide vane support ring; and
      $c_{2c}$. an inner guide vane support ring affixed to the inwardly depending ends of said guide vanes;
   $c_3$. said guide vane assembly being fabricated from non-magnetic material incapable of supporting electrical currents and surrounding a portion of said rotor;
   $c_4$. at least one removable annular fan rub ring affixed to said stator assembly surrounding the exterior of each said fan and in close proximity thereto sufficient to minimize gas flow leakage between said fan and said rub ring;
d. an annular flow guide ring affixed to said stator assembly downstream of the last fan affixed to said rotor and providing a portion of a smooth channel for providing a smooth gas flow downstream of said guide vane and said fan assembly.

2. The dynamoelectric machine of claim 1 wherein said guide vane assembly and rub ring are formed in a plurality of arcuate sections to provide for ease of assembly and disassembly.

3. The dynamoelectric machine of claim 1 wherein said guide vane assembly and said rub ring are affixed to said flow guide ring by means of a plurality of metallic non-magnetic fasteners binding upon metallic non-magnetic inserts bonded to apertures formed in said respective members to provide all metal-to-metal tensioning and the avoidance of any relaxation effects in said non-metallic members.

4. In a dynamoelectric machine of the type having a stator including a core, a rotor disposed within said core and defining with said stator a gas gap, the improvement comprising:
a. a fan and guide ring assembly for forcing cooling gas from said gas gap to a gas cooler and comprising at least one fan stage affixed to said rotor and adapted to force cooling gas axially outwardly from said gas gap and a guide vane assembly associated with and disposed upstream of said fan stage for directing cooling gas toward said fan stage with optimum efficiency;
b. said guide vane assembly comprising:
   $b_1$. an outer guide vane support ring,
   $b_2$. an inner guide vane support ring and
   $b_3$. a plurality of airfoil shaped guide vanes supported radially with respect to the longitudinal axis of said rotor between said outer and inner support rings,
c. a fan nozzle ring affixed to said stator;
d. an annular rub ring circumferentially surrounding each of said fan stages and adapted in cooperation therewith to minimize gas leakage past said fan stage;
e. means fastening said rub ring and said guide vane assembly to the radially inner portion of said fan nozzle ring;
f. said fan nozzle ring and said guide vane assembly being formed of non-metallic, non-magnetic material incapable of sustaining electrical current.

5. The dynamoelectric machine of claim 4 wherein said means fastening said rub ring and said guide vane assembly includes a plurality of metallic non-magnetic bolts extending therethrough and binding upon metallic non-magnetic inserts and bushings bonded to apertures formed in said non-metallic members to provide a complete metal-to-metal fastening and thereby avoid any relaxation effects in said non-metallic members.

6. The dynamoelectric machine of claim 5 wherein said metallic fastening means are formed of stainless steel and chrome-copper.

7. The dynamoelectric machine of claim 5 wherein said guide vane assembly and said rub ring are formed in a plurality of arcuate segments for ease of assembly and disassembly.

8. the dynamoelectric machine of claim 5 wherein said fan and guide vane assembly includes a single fan stage and a single guide vane assembly.

9. The dynamoelectric machine of claim 5 wherein said fan and guide ring assembly includes a plurality of fan stages and an equal number of guide vane assemblies.

* * * * *